US012556645B2

United States Patent
Noh

(10) Patent No.: US 12,556,645 B2
(45) Date of Patent: Feb. 17, 2026

(54) VIDEO RECORD SYSTEM FOR VEHICLE AND METHOD FOR CONTROLLING THE SAME

(71) Applicants: Hyundai Motor Company, Seoul (KR); Kia Corporation, Seoul (KR)

(72) Inventor: Seung Yeop Noh, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/746,783

(22) Filed: Jun. 18, 2024

(65) Prior Publication Data
US 2025/0063128 A1 Feb. 20, 2025

(30) Foreign Application Priority Data
Aug. 16, 2023 (KR) .................. 10-2023-0106946

(51) Int. Cl.
| | |
|---|---|
| H04N 5/04 | (2006.01) |
| B60R 11/04 | (2006.01) |
| G06V 20/56 | (2022.01) |
| G07C 5/08 | (2006.01) |
| H04N 5/06 | (2006.01) |
| H04N 5/77 | (2006.01) |
| H04N 5/907 | (2006.01) |
| H04N 5/91 | (2006.01) |
| H04N 7/01 | (2006.01) |
| H04N 7/18 | (2006.01) |

(52) U.S. Cl.
CPC .............. *H04N 5/04* (2013.01); *G06V 20/56* (2022.01); *H04N 7/0135* (2013.01)

(58) Field of Classification Search
None
See application file for complete search history.

(56) References Cited

U.S. PATENT DOCUMENTS

| | | | |
|---|---|---|---|
| 5,544,176 A * | 8/1996 | Fujii | G11B 20/18 386/268 |
| 2014/0049636 A1* | 2/2014 | O'Donnell | H04N 7/18 348/143 |
| 2017/0223269 A1* | 8/2017 | Fluegel | H04N 23/662 |
| 2020/0186712 A1* | 6/2020 | Högasten | H04N 25/673 |
| 2021/0176379 A1* | 6/2021 | Shin | H04N 23/90 |

\* cited by examiner

*Primary Examiner* — Hung Q Dang
(74) *Attorney, Agent, or Firm* — Fox Rothschild LLP

(57) ABSTRACT

A video record system for a vehicle includes a plurality of cameras which respectively film videos around the vehicle; a first memory which stores videos received from the cameras; and a controller which includes a second memory for storing a computer program to access the videos stored in the first memory, and a processor for executing the computer program, where each of the cameras includes a synchronization indicator in a corresponding video according to a synchronization signal received from the controller, and the controller checks a synchronization state of the videos received from the cameras by using the synchronization indicator.

14 Claims, 7 Drawing Sheets

VIDEO RECORD SYSTEM FOR VEHICLE AND METHOD FOR CONTROLLING THE SAME

CROSS-REFERENCE TO RELATED APPLICATION

The present application claims under 35 U.S.C. § 119 (a) the benefit of Korean Patent Application No. 10-2023-0106946, filed on Aug. 16, 2023, the entire contents of which are incorporated herein by reference.

BACKGROUND (a) Technical Field

The present disclosure relates to a video record system for a vehicle, and a method for controlling the same.

(b) Description of the Related Art

A driving video record system, for example, is a device for recording a video of a driving situation of a vehicle.

To this end, the driving video record system typically includes a controller, a memory for storing videos, and a camera for filming videos.

In general, the driving video record system stores vehicle driving data together with a video of vehicle surroundings while driving and records a video according to an already input setting when the generation of a set event is sensed during parking.

The driving video record system was initially called a so-called black box and was only installed as an external type, but recently, it has been built-in to the vehicle during assembly.

The driving video record system includes a plurality of cameras, and the controller receives and stores videos captured by the respective cameras to secure recorded videos.

In this case, when a delay occurs during video processing or in a communication state during a process when some of the videos of the plurality of cameras are received by the controller, the videos received by the controller may be recorded in a state in which they are not temporally synchronized with each other, which may cause confusion in interpreting a corresponding accident.

For example, as shown in FIG. 1A (RELATED ART), it is assumed that the first front camera and the second front camera perform filming from the time t1, and the traffic light is changed from red at time tn to yellow at time tn+2.

At this time, as shown in FIG. 1B (RELATED ART), when the filmed videos of the front first camera and the front second camera are received by the controller, the video of the front first camera may be delayed by td.

In this case, when the controller records two videos at time ts according to the setting, the recorded video by the front first camera becomes the tn+2 video frame as the start frame, but the recorded video by the front second camera becomes the tn video frame as the start frame.

When an accident is analyzed using two recorded videos, a traffic light is yellow from the first front camera, but a traffic light is red from the second front camera.

SUMMARY

An embodiment of the present disclosure aims to prevent a time-inconsistency when accident videos are recorded by a plurality of cameras.

Another purpose of an embodiment of the present disclosure is to detect the occurrence of a camera failure through video delay.

A video record system for a vehicle according to an embodiment of the present disclosure comprises a plurality of cameras configured to capture videos around the vehicle, a first memory configured to store the videos, and a controller comprising a second memory configured to store a computer program for accessing the videos being stored in the first memory and a processor configured to execute the computer program, wherein each of the plurality of cameras is further configured to insert a synchronization indicator in a video according to a synchronization signal received from the controller, and the controller is configured to determine a synchronization state of the videos received from the plurality of cameras based on the synchronization indicator.

In at least one embodiment of the present disclosure, the synchronization indicator includes a blank frame inserted according to the synchronization signal.

In at least one embodiment of the present disclosure, the controller is further configured to synchronize the videos based on the synchronization indicator.

In at least one embodiment of the present disclosure, the controller is further configured to adjust frames of delayed one of the videos by a number of frames delayed based on the synchronization indicator.

In at least one embodiment of the present disclosure, the controller is further configured to determine whether the delayed one includes one or more frame vacancies as a result of the frames being adjusted.

In at least one embodiment of the present disclosure, the controller is configured to insert one or more additional video frames into the one or more frame vacancies.

In at least one embodiment, the one or more additional video frames are acquired by interpolating video frames immediately before and after the one or more frame vacancies.

In at least one embodiment of the present disclosure, the controller is further configured to store the synchronized videos without the synchronization indicator.

In at least one embodiment of the present disclosure, the controller is further configured to determine that a camera among the plurality of cameras is in an abnormal state in response that a number of times that a video of the camera is delayed is equal to or greater than a predetermined number.

In at least one embodiment of the disclosure, the plurality of cameras comprises a front camera, a rear camera, a left camera, and a right camera.

According to another aspect of an embodiment, there is provided a method for controlling a video record system in a vehicle, which comprises a plurality of cameras configured to capture videos around the vehicle, a first memory configured to store the videos, and a controller comprising a second memory configured to store a computer program for accessing the videos being stored in the first memory and a processor executing the computer program, includes transmitting, by the controller, a synchronization signal to each of the plurality of cameras, inserting, by each of the plurality of cameras, a synchronization indicator in a corresponding video according to the synchronization signal, and determining, by the controller, a synchronization state of the videos received from the plurality of cameras based on the synchronization indicator.

In the controlling method according to at least one embodiment of the present disclosure, the synchronization indicator includes a blank frame according to the synchronization signal.

In the controlling method according to at least one embodiment of the present disclosure, the method further includes synchronizing, by the controller, the videos received from the plurality of cameras based on the synchronization indicator.

In the controlling method according to at least one embodiment of the present disclosure, the method further includes adjusting, by the controller, frames of delayed one of the videos by a number of frames delayed based on the synchronization indicator.

In the controlling method according to at least one embodiment of the present disclosure, the method further includes determining, by the controller, whether the delayed one includes one or more frame vacancies as a result of the frames being adjusted.

In the controlling method according to at least one embodiment of the present disclosure, the method further includes inserting, by the controller, one or more additional video frames into the one or more frame vacancies.

In the controlling method according to at least one embodiment of the present disclosure, the one or more additional video frames are acquired by interpolating video frames immediately before and after the one or more frame vacancies.

In the controlling method of at least one embodiment of the present disclosure, the method further includes storing, by the controller, the synchronized videos without the synchronization indicator.

In the controlling method of at least one embodiment of the present disclosure, the method further includes determining, by the controller, that a camera among the plurality of cameras is in an abnormal state in response that a number of times that a video of the camera is delayed is equal to or greater than a predetermined number.

According to another aspect of embodiment, there is provided a vehicle comprising a video record system comprising a plurality of cameras configured to capture videos around the vehicle, a first memory configured to store the videos received from the plurality of cameras, and a controller comprising a second memory configured to store a computer program for accessing the videos being stored in the first memory and a processor configured to execute the computer program wherein each of the plurality of cameras is configured to insert a synchronization indicator in a corresponding video according to a synchronization signal received from the controller, and the controller is configured to determine a synchronization state of the videos received from the plurality of cameras based on the synchronization indicator.

According to an embodiment of the present disclosure, when accident videos are recorded by a plurality of cameras, synchronized videos may be acquired without temporal deviation from each other.

Also, according to an embodiment of the present disclosure, it is possible to detect whether a camera has failed through a video delay.

DETAILED DESCRIPTION

Figure 1A:
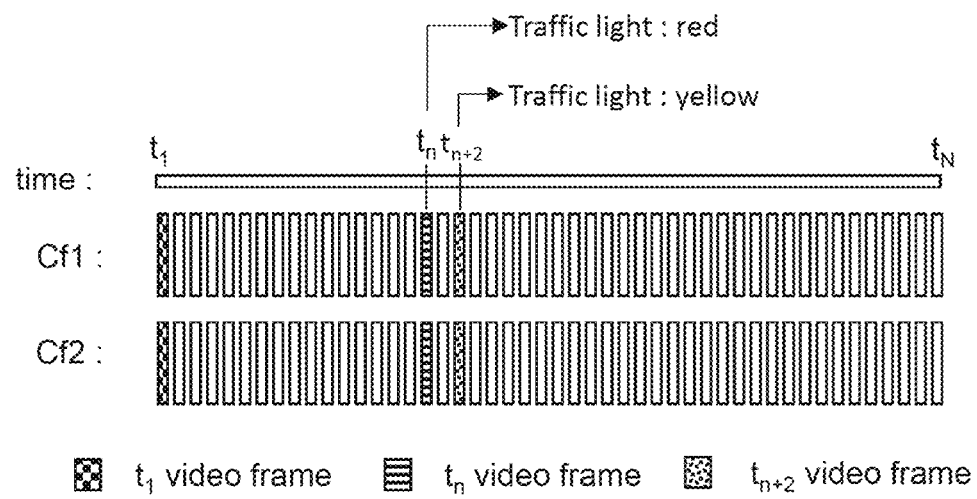
FIGS. 1A and 1B (RELATED ART) are schematic depictions for explaining problems of the related art.
Figure 1B:
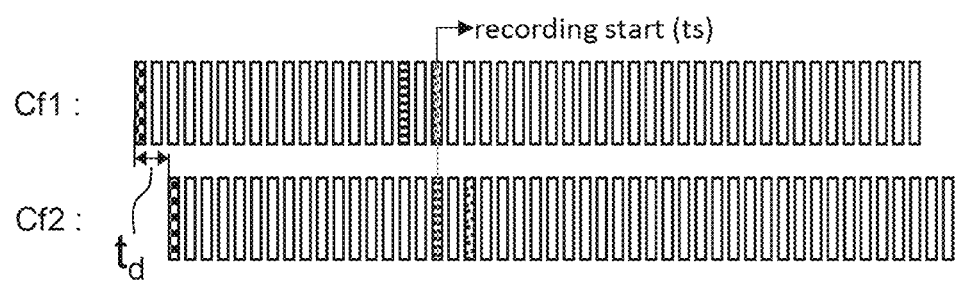

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Since the present disclosure is modified in various ways and has various embodiments, specific embodiments will be illustrated and described in the drawings. However, this is not intended to limit the present disclosure to specific embodiments, and it should be understood that the present disclosure includes all modifications, equivalents, and replacements included on the idea and technical scope of the present disclosure.

Terms including ordinals such as "first," "second," and the like may be used to describe various elements, but the elements are not limited by the terms. The terms are used only for the purpose of distinguishing one element from another element.

When an element is "connected" or "linked" to another element, it should be understood that the element may be directly connected or connected to another element, but another element may exist in between.

Unless otherwise defined, all terms used herein, including technical or scientific terms, have the same meaning as that generally understood by those skilled in the art. It will be understood that terms, such as those defined in commonly used dictionaries, should be interpreted as having a meaning that is consistent with their meaning in the context of the relevant art and will not be interpreted in an idealized or overly formal sense unless expressly so defined herein.

In addition, the term "unit" or "control unit" is a term widely used for naming a controller that commands a specific function, and does not mean a generic function unit. For example, each unit or control unit may include a communication device communicating with another controller or sensor, a computer-readable recording medium storing an operating system or a logic command, input/output information, and the like, in order to control a function in charge, and one or more processors performing determination, calculation, determination, and the like necessary for controlling a function in charge.

Meanwhile, the processor may include a semiconductor integrated circuit and/or electronic elements that perform at least one or more of comparison, determination, calculation, and determination to achieve a programmed function. For example, the processor may be one of a computer, a microprocessor, a CPU, an ASIC, and a circuitry (logic circuits), or a combination thereof.

In addition, the computer-readable recording medium (or simply referred to as a memory) includes all types of storage devices in which data that can be read by a computer system is stored. For example, the memory may include at least one type of a flash memory of a hard disk, of a microchip, of a card (e.g., a secure digital (SD) card or an eXtream digital (XD) card), etc., and at least a memory type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk.

The recording medium may be electrically connected to the processor, and the processor may retrieve and record data from the recording medium. The recording medium and the processor may be integrated or may be physically separated.

Hereinafter, the embodiments of the present disclosure will be described in detail with reference to the accompanying drawings.

Figure 2:
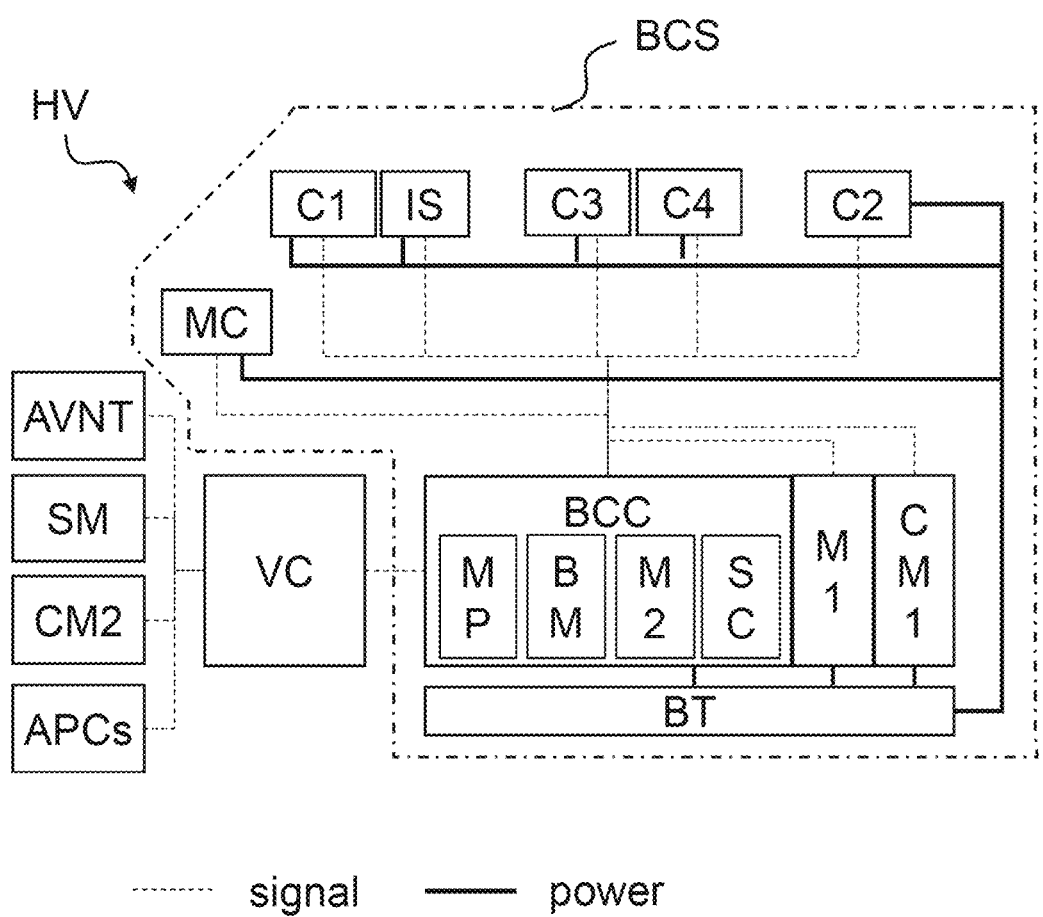
FIG. 2 is a block drawing conceptually showing elements of a driving video record system according to an embodiment of the present disclosure.
Figure 3:
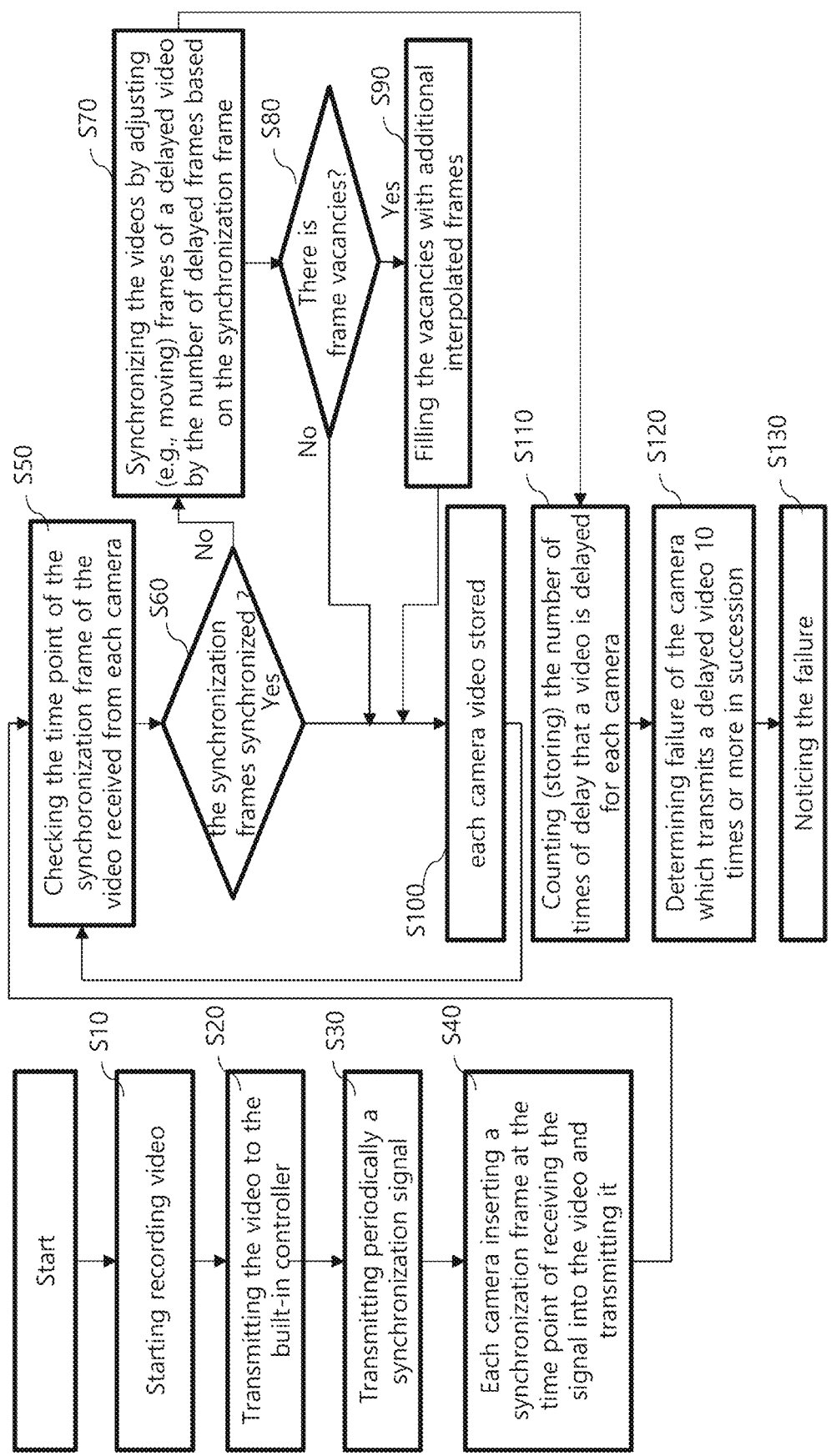
FIG. 3 is a flowchart illustrating a controlling method of a driving video record device according to an embodiment of the present disclosure.

Referring to FIG. 2, the built-in camera system BCS, which is an embedded driving video record device according to an embodiment of the present disclosure, is embedded in a host vehicle HV and includes camera modules C1 to C4, a computer-readable storage medium M1, a first communication module CM1, a microphone MC, an impact sensor IS, an auxiliary power battery BT, and a built-in cam controller BCC.

Although the video record system of the present embodiment is a built-in type, it is not limited thereto.

First, the camera modules C1 to C4 include a first camera C1, a second camera C2, a third camera C3, and a fourth camera C4 in the present embodiment, but they are not limited thereto. For example, the first camera C1 is a front camera that films a front region of the vehicle HV, the second camera C2 is a rear camera that films a rear region of the vehicle HV, the third camera C3 is a left camera that films a left side of the vehicle HV, and the fourth camera C4 is a right camera that films a right side of the vehicle HV.

For example, the front camera may be installed at a position near the room mirror in the vehicle (HV) cabin of the window shield, and the rear camera may be installed at the rear window of the vehicle (HV) cabin or the rear bumper. Also, the left and right cameras, respectively, may be installed on a side mirror, on a front or rear fender, or on a bumper.

For example, the front camera and the rear camera have the image quality of either an HD, an FHD, or a Quad HD.

It is evident that the front camera and the rear camera do not need to have the same image quality, and a camera of an Advanced Drive Assistance System ADAS system of the host vehicle HV may be used.

Further, the camera has an aperture value of F2.0 or less, preferably F1.6 or less. If the aperture value decreases, more light is gathered so that recording may be made brighter. In addition, by applying image tuning technology to minimize the noise and the loss of light, clear recording is possible even in a dark environment.

The computer-readable recording medium (hereinafter, called "memory", in short) includes all types of storage devices in which data that can be read by a computer system is stored. For example, the memory includes at least a memory type of a flash memory, of a hard disk, of a microchip, of a card (e.g., a Secure Digital (SD) card or an eXtream Digital (XD) card), etc., and at least a memory type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk.

In this embodiment, the memory M1 may be 64 Gbytes or more, e.g., a Micro SD card, which is preferably of an external type. For example, real-time recording when traveling (hereinafter, simply referred to as an "driving real-time recording") may be performed for several hours, and a real-time recording when parking (hereinafter, simply referred to as "parking real-time recording") may be performed for several tens of hours. In addition, event record according to impact detection may be performed up to several tens of times. The event record may include record according to impact occurrence when traveling (hereinafter, referred to as "driving impact recording") and record according to impact occurrence when parking (hereinafter, referred to as "parking impact recording"). Here, whether the current mode is in the driving mode or the parking mode may be determined, when the vehicle start switch is "IGN ON" (ignition on) for a driving mode, and when the vehicle start switch is not "ON" for a parking mode.

The user can easily check the contents stored in the memory in a desktop computer or the like by extracting the SD card.

The information of the state of the SD card can be checked through the connected car service, and the time of replacement according to the memory state can also be checked.

The first communication module CM1 is for wired or wireless communication with the exterior and is not limited to communication protocol.

In the present embodiment, the first communication module CM1 includes a communication device capable of directly communicating with nearby devices, and illustratively supports Wi-Fi. The Wi-Fi module of the present embodiment may include an Access Point (AP) function, and a user may easily and quickly access the built-in cam through, for example, a smartphone.

Due to Wi-Fi, the user can easily and quickly access the built-in cam through, for example, a smartphone.

The microphone MC supports voice recording. When the driving images of the vehicle HV is recorded, not only the images are recorded but also the voices are recorded as well.

The impact sensor IS senses an external impact and may be a one-axis or a three-axis acceleration sensor.

The impact sensor IS may be prepared as the built-in cam system BCS, but it is evident that it may be used as an acceleration sensor installed in the host vehicle HV.

The signals of the impact sensor IS may be starting points for a later described event recording, and the degree of impact serving as a references thereof can be set by the user.

For example, the user may select an impact detection sensitivity that is a reference for event record when setting up the built-in cam system BCS through a display screen (e.g., an AVNT screen as described later) in the vehicle HV.

For example, the impact sensitivity may be classified into five levels: the first level (highly unresponsive), the second level (unresponsive), the third level (normal sensitivity), the fourth level (sensitive), and the fifth level (highly sensitive).

The built-in cam system BCS receives power from a battery (e.g., a 12V battery) installed in the vehicle HV.

Although the system is operated by receiving power of the vehicle HV battery during parking as well as during driving, there may be an over-discharge problem of the vehicle HV battery, and thus, the present embodiment includes the power auxiliary battery BT.

In the present embodiment, the built-in cam system BCS receives power from any one of the batteries of the vehicle HV, of the alternator in the case of the internal combustion engine vehicle, and of the lower DC/DC converter in the case of the electric vehicle, while receiving power from the power auxiliary battery BT during parking. However, it is not limited thereto.

The power auxiliary battery BT is charged and discharged depending on an operating environment of the vehicle HV and supplies optimal power for recording and OTA software update during parking.

The charging of the power auxiliary battery BT is performed by a vehicle HV battery (a low voltage battery or a high voltage battery of an electric vehicle), or performed by an alternator in the case of an internal combustion engine vehicle HV.

The built-in cam controller BCC is a superior controller that controls other components of the built-in cam system BCS and exchanges signals with the controller VC of the host vehicle HV and/or the head unit HU, the sensor module SM, the component controllers APCs, Audio Video Navigation Telematics (AVNT), etc. For example, local interconnect network LIN or controller area network CAN communication may be used for such signal exchange.

Here, the sensor module SM includes one or more of a speed sensor, of an acceleration sensor, of a vehicle position sensor (e.g., a GPS receiver), of a steering angle sensor, of a yaw rate sensor, of a pitch sensor, and of a roll sensor, and the component controllers APCs may include one or more of a turn signal controller, of a turn signal controller, of a wiper controller, of an ADAS system controller, and of an airbag controller.

The built-in cam controller (BCC) controls other components to perform constant recording while driving, constant recording while parking, event recording for recording according to the impact signal of the impact sensor, etc.

When recording, driving information of the vehicle HV is recorded as well.

Here, the vehicle (HV) driving information includes time, vehicle speed, gear position, turn signal information, impact detection sensitivity (one corresponding to the above-described five levels), global positioning system GPS position information, etc.

The vehicle driving information may be received from the vehicle controller VC, but it is that it may also be directly received from a corresponding module or component of the vehicle HV. For example, a vehicle speed may be directly received from a speed sensor of the vehicle HV, a turn signal information (or turn signal information from a turn signal controller) may be directly received from a turn signal controller, or a GPS location information may be received from a AVNT or a GPS receiver.

As described above, the event recording is performed when the event occurrence is detected while parking depending on the impact detection sensitivity set by the user.

In the event recording, recording is performed from a set time before the event occurrence time to a set time after the event occurrence time, and the set time may be selected by the user.

The AVNT is connected to the built-in cam controller BCC through the vehicle controller VC or directly, and the AVNT screen functions as a user interface for receiving various set parameters of the built-in cam system BCS from the user.

The built-in cam controller BCC transmits recorded content to an external server according to a set period, a user selection, or an event (e.g., a degree of impact detection) from a user setting.

The built-in cam controller BCC includes a memory M2 and a processor MP to perform its functions.

In an embodiment, the processor MP may include a semiconductor integrated circuit and/or electronic devices that perform at least one or more of comparison, determination, calculation, and determination to achieve a programmed function. For example, the processor MP may be a computer, a microprocessor MC, a CPU, an ASIC, and electronic circuits (circuitry, logic circuits), or a combination thereof.

The memory M2 may be any type of storage device that stores data that can be read by a computer system, and may include, for example, at least one of a flash memory type, a hard disk type, a micro type, a card type (e.g., a secure digital (SD) card or an eXtream digital (XD) card), etc., and at least a memory type of a Random Access Memory (RAM), of a Static RAM (SRAM), of a Read-Only Memory (ROM), of a Programmable ROM (PROM), of an Electrically Erasable PROM (EEPROM), of a Magnetic RAM (MRAM), of a magnetic disk, and of an optical disk.

Operating software of the BCC is stored in the memory M2, and the processor MP reads and executes the corresponding software to perform the function of the BCC.

In addition, the built-in cam controller BCC includes a buffer memory BM for determination, calculation, and the like in the processor MP.

Also, the built-in cam controller BCC includes a super capacitor SC. The super capacitor SC is charged when power is applied to the built-in cam controller BCC.

When power is suddenly cut off due to impact, damage, or the like, power charged in the super capacitor SC is used to complete video storage that is in progress.

For example, the super capacitor SC have a charging capacity capable of maintaining the power of the built-in cam controller BCC from several to tens of seconds.

Hereinafter, a control process for recording an accident video will be described in detail with reference to FIG. 2.

First, when the built-in cam system BCS starts to operate, the cameras C1 to C4 start to capture a video in S10.

Then, the cameras C1 to C4 transmit the filmed videos to the controller BCC (S20).

The controller BCC periodically transmits the synchronization signal to the cameras C1 to C4 at the same time in S30.

Figure 4:
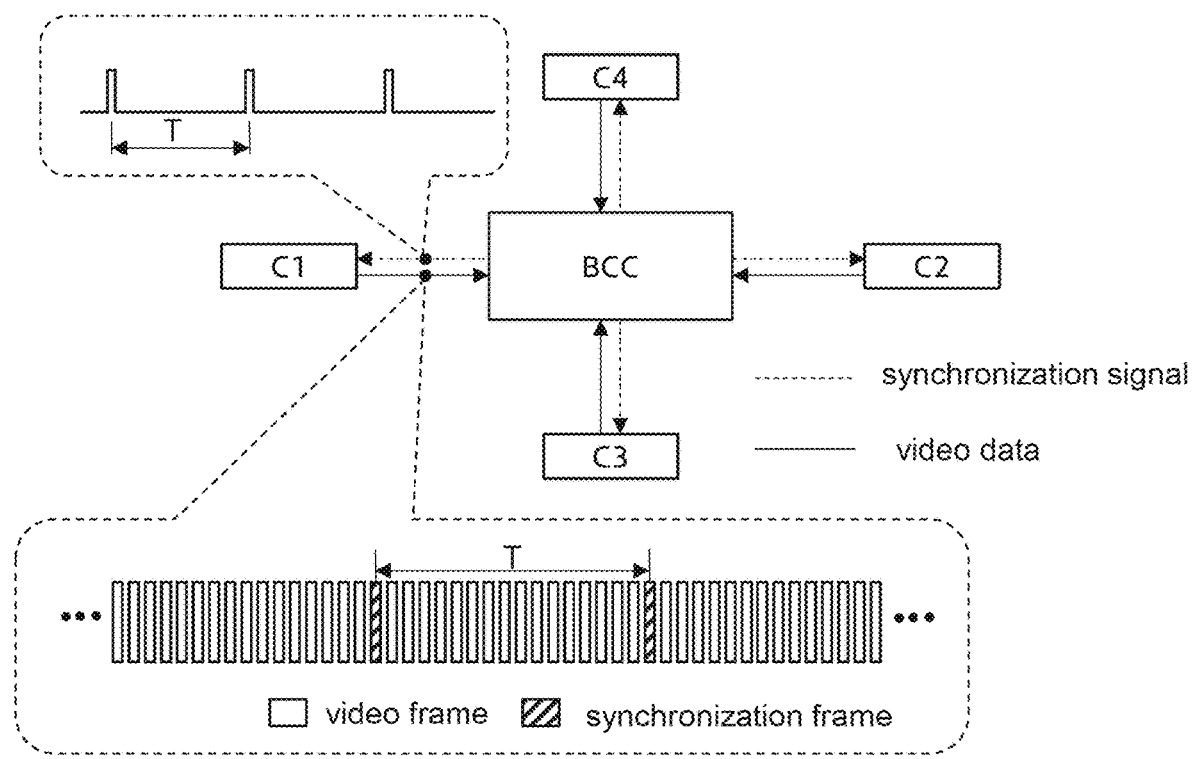
FIG. 4 illustrates a transfer situation of a signal and a video between a controller and each camera according to an embodiment of the present disclosure.

For example, the synchronization signal may be a clock signal transmitted at a predetermined period T as shown in FIG. 4.

When the cameras C1 to C4 receive the synchronization signal, they insert synchronization indicators into the videos at the reception time and transmit the videos to the controller BCC (S40).

For example, the synchronization indicator may include a blank frame as a synchronization frame. That is, each of the cameras C1 to C4 may insert the synchronization frame between video frames at a time when the synchronization signal is received.

Videos in which the synchronization frame are inserted at the same time are transmitted to the controller BCC, as shown in FIG. 4.

For example, as shown in FIG. 4, the video received from the first camera C1 to the controller BCC is a video in which a synchronization frame is inserted at a predetermined period T. Although not shown, the videos received from the second camera C2, the third camera C3, and the fourth camera C4 to the controller BCC are also videos into which the synchronization frame is inserted at the predetermined period T.

The controller BCC checks the synchronization frame for the videos received from the cameras $C_1$ to $C_4$ (S50).

In S60, the controller BCC determines whether the time of the synchronization frames of the videos coincide with each other.

If it is determined in S60 that the time of the synchronization frames coincide with each other, the controller BCC records each video in S100.

At this time, if it is determined that any one of the synchronization frames does not coincide with the other synchronization frames in S60, the controller BCC synchronizes the videos in S70.

Figure 5:
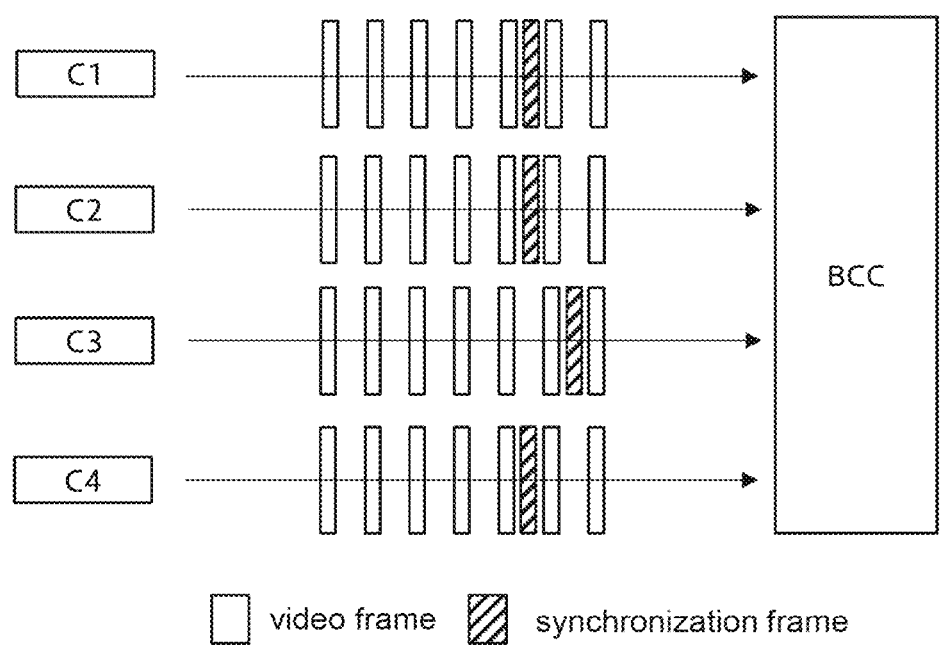
FIG. 5 illustrates that a video is transmitted from each camera to a controller according to an embodiment of the present disclosure.

For example, as shown in FIG. 5, the videos of the first camera C1, the second camera C2, and the fourth camera C4 may be delayed compared to the video of the third camera C3 and received by the controller BCC, and accordingly, the controller BCC may determine the synchronization frame as mismatched in S60.

Figure 6:
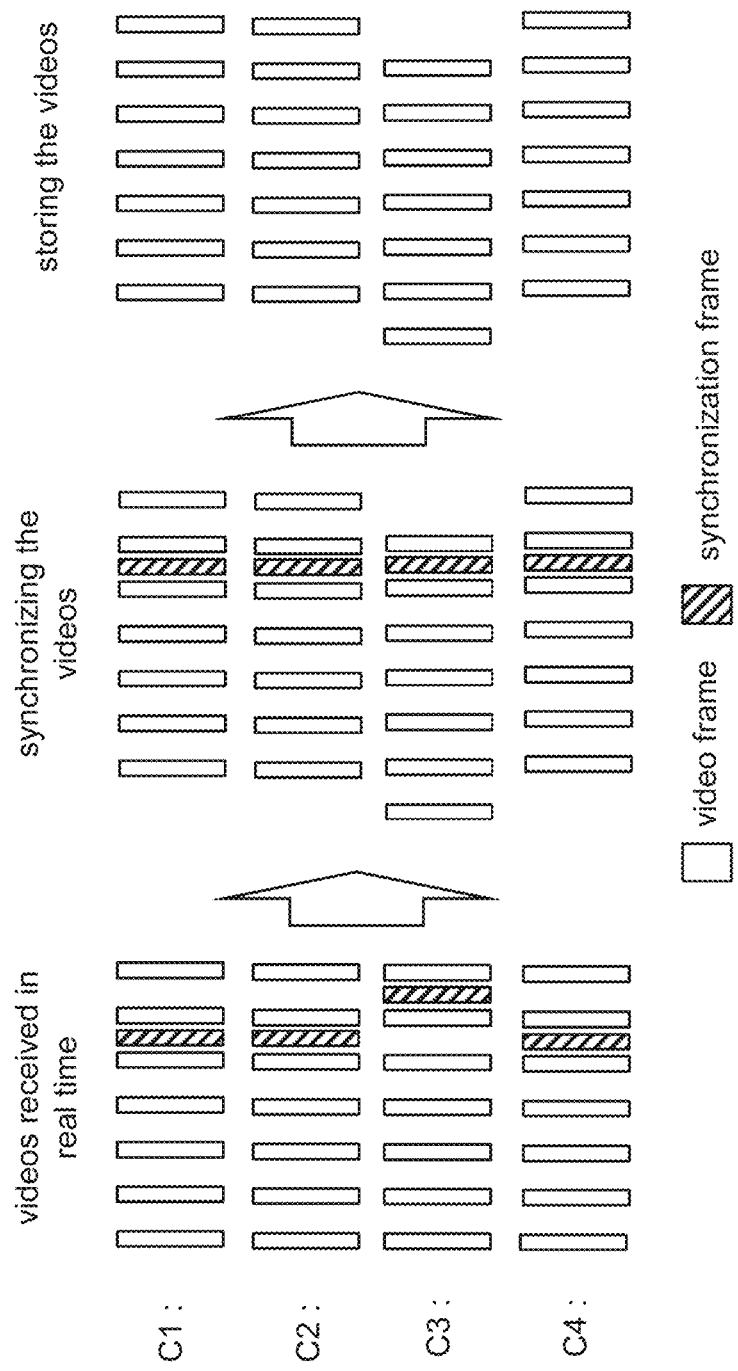
FIG. 6 illustrates a process of acquiring a recorded video after synchronizing videos received from cameras according to an embodiment of the present disclosure.

In S70 as shown in FIG. 6, the controller BCC synchronizes the delayed videos by moving the delayed videos by the number of delayed video frames and adjusting the delayed videos.

After the videos are synchronized, the controller BCC excludes synchronized frames as shown in FIG. 6 when recording the videos in S100.

Figure 7:
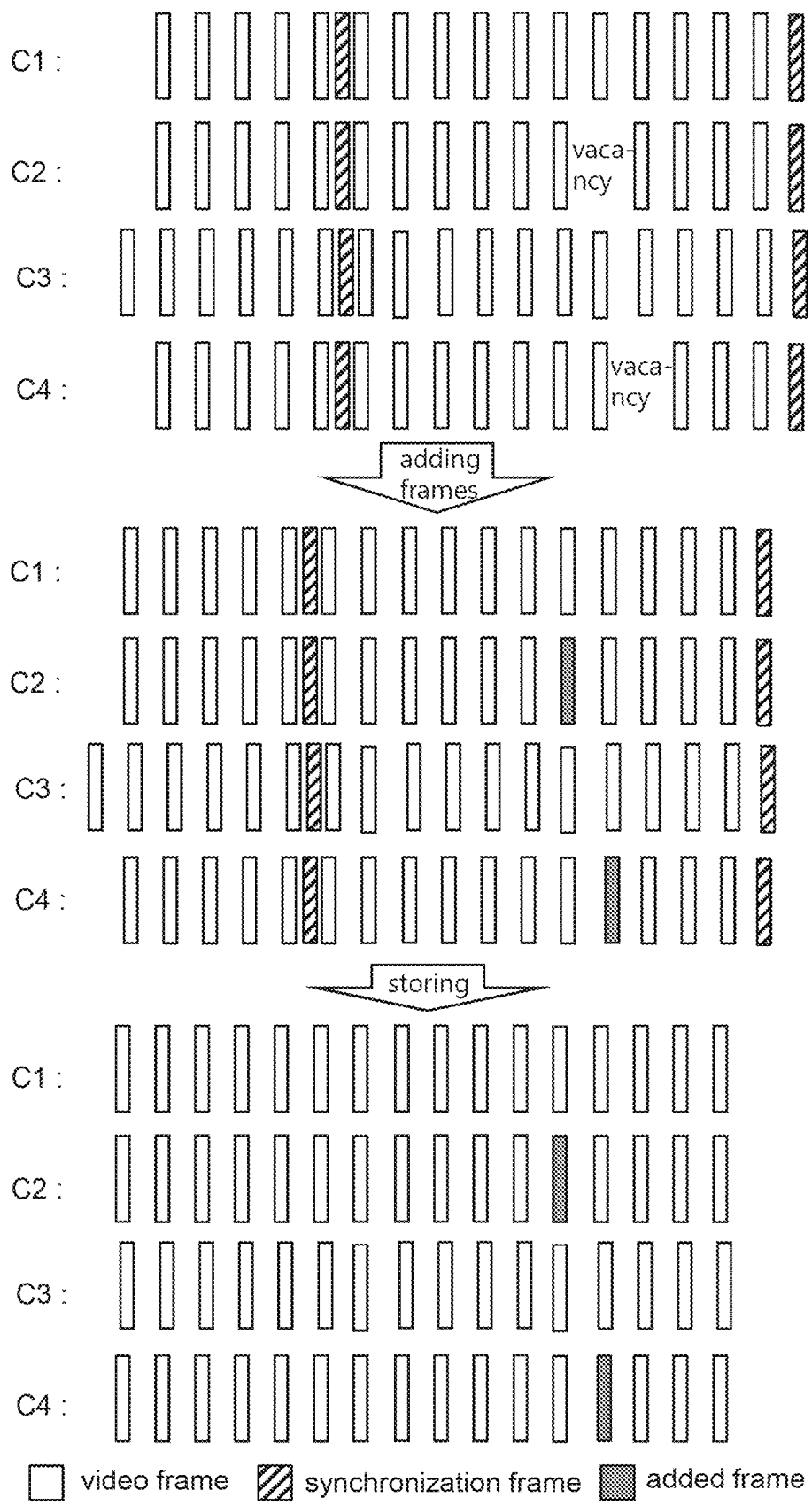
FIG. 7 illustrates a case where an additional video frame is inserted and stored according to an embodiment of the present disclosure when a video frame is vacant.

Meanwhile, in S70, the video synchronization is performed by moving the frames forward by the number of the delayed frames with respect to the delayed video, and thus, as illustrated in FIG. 7, an empty space of the frame may be generated according to a reception state of the subsequent frames.

In order to compensate for this, the controller BCC checks which video lacks one or more video frames in S80.

If it is determined that there is one or more frame vacancies (Yes at operation S80), one or more additional frames may be inserted into the vacant frame positions in S90 as illustrated in FIG. 7.

For example, the additional frame may be acquired by interpolating video frames immediately before and after the additional frame. For example, the pixel values of the previous video frame and the pixel values of the next video frame are summed and divided by 2, thereby obtaining an additional video frame. That is, the n×M pixel value of the previous video frame and the n×M pixel value of the next video frame are summed, and then the summed value is divided into 2 to obtain a value for the n×M pixel of the additional frame, thereby obtaining the additional frame.

After the frame vacancies are filled, the corresponding video is stored in S100, and as illustrated in FIG. 7, the video is stored without synchronization frames.

Meanwhile, when the video delay for the cameras C1 to C4 is confirmed, the controller BCC counts and stores the number of times of delay occurrence for each camera (S110).

Further, in S120, when the delay is continuously generated more than a predetermined number of times (i.e., 10 times), it may be determined that the corresponding camera is in the failure state.

In S130, a camera failure notification may be transmitted.

For example, the controller BCC may transmit a camera failure notification to an instrument cluster (not shown), and the instrument may turn on a warning light indicating camera failure.

While the present disclosure has been particularly shown and described with reference to exemplary embodiments thereof, these embodiments are only proposed for illustrative purposes, and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A video record system for a vehicle, the system comprising:
    a plurality of cameras configured to capture videos around the vehicle;
    a first memory configured to store the videos; and
    a controller comprising a second memory configured to store a computer program for accessing the videos being stored in the first memory and a processor configured to execute the computer program,
    wherein each of the plurality of cameras is further configured to insert a synchronization indicator in the videos according to a synchronization signal received from the controller, and the controller is configured to determine a synchronization state of the videos received from the plurality of cameras based on the synchronization indicator, and wherein the controller is further configured to:
- synchronize the videos based on the synchronization indicator,
- adjust frames of a delayed one of the videos by a number of frames based on the synchronization indicator, and
- determine whether the delayed one of the videos includes one or more frame vacancies as a result of the frames being adjusted.

2. The system according to claim 1, wherein the synchronization indicator includes a blank frame inserted according to the synchronization signal.

3. The system according to claim 1, wherein the controller is configured to insert one or more additional video frames into the one or more frame vacancies.

4. The system according to claim 3, wherein the one or more additional video frames are acquired by interpolating video frames immediately before and after the one or more frame vacancies.

5. The system according to claim 1, wherein the controller is further configured to store the synchronized videos without the synchronization indicator.

6. The system according to claim 1, wherein the controller is further configured to determine that a camera among the plurality of cameras is in an abnormal state when a number of times that a video of the camera is delayed is equal to or greater than a predetermined number.

7. The system according to claim 1, wherein the plurality of cameras comprises a front camera, a rear camera, a left camera, and a right camera.

8. A method for controlling a video record system in a vehicle, which comprises a plurality of cameras configured to capture videos around the vehicle, a first memory configured to store the videos, and a controller comprising a second memory configured to store a computer program for accessing the videos being stored in the first memory and a processor executing the computer program, the method including:
- transmitting, by the controller, a synchronization signal to each of the plurality of cameras;
- inserting, by each of the plurality of cameras, a synchronization indicator in a corresponding video according to the synchronization signal;
- determining, by the controller, a synchronization state of the videos received from the plurality of cameras based on the synchronization indicator;
- synchronizing, by the controller, the videos received from the plurality of cameras based on the synchronization indicator;
- adjusting, by the controller, frames of a delayed one of the videos by a number of frames delayed based on the synchronization indicator; and
- determining, by the controller, whether the delayed one of the videos includes one or more frame vacancies as a result of the frames being adjusted.

9. The method according to claim 8, wherein the synchronization indicator includes a blank frame according to the synchronization signal.

10. The method according to claim 8, further including inserting, by the controller, one or more additional video frames into the one or more frame vacancies.

11. The method according to claim 10, wherein the one or more additional video frames are acquired by interpolating video frames immediately before and after the one or more frame vacancies.

12. The method according to claim 8, further including storing, by the controller, the synchronized videos without the synchronization indicator.

13. The method according to claim 8, further including determining, by the controller, that a camera among the plurality of cameras is in an abnormal state in response that a number of times that a video of the camera is delayed is equal to or greater than a predetermined number.

14. A vehicle comprising:
- a video record system comprising a plurality of cameras configured to capture videos around the vehicle, a first memory configured to store the videos received from the plurality of cameras, and a controller comprising a second memory configured to store a computer program for accessing the videos being stored in the first memory and a processor configured to execute the computer program, wherein each of the plurality of cameras is configured to insert a synchronization indicator in a corresponding video according to a synchronization signal received from the controller, and the controller is configured to determine a synchronization state of the videos received from the plurality of cameras based on the synchronization indicator, and wherein the controller is further configured to:
- synchronize the videos based on the synchronization indicator,
- adjust frames of a delayed one of the videos by a number of frames based on the synchronization indicator, and
- determine whether the delayed one of the videos includes one or more frame vacancies as a result of the frames being adjusted.

* * * * *